United States Patent
Yu et al.

(10) Patent No.: US 8,235,293 B2
(45) Date of Patent: Aug. 7, 2012

(54) METHODS AND DEVICES FOR DETERMINING BIT TIME MIX CHOICES OF FREQUENCIES OF OPTICALLY TRANSMITTED BARCODES

(75) Inventors: Huinan J Yu, Kildeer, IL (US); Jun Jiang, Lake Zurich, IL (US); John R St. Peter, Elburn, IL (US)

(73) Assignee: Motorola Mobility LLC, Libertyville, IL (US)

(*) Notice: Subject to any disclaimer, the term of this patent is extended or adjusted under 35 U.S.C. 154(b) by 0 days.

(21) Appl. No.: 12/619,427

(22) Filed: Nov. 16, 2009

(65) Prior Publication Data
US 2011/0114717 A1  May 19, 2011

(51) Int. Cl.
*G06K 7/00* (2006.01)
*G06K 15/00* (2006.01)

(52) U.S. Cl. .............. 235/462.13; 235/462.01

(58) Field of Classification Search ............ 235/462
See application file for complete search history.

(56) References Cited

U.S. PATENT DOCUMENTS
| | | |
|---|---|---|
| 5,760,383 A | 6/1998 | Heske, III |
| 7,028,906 B2 * | 4/2006 | Challa et al. ........ 235/462.46 |
| 7,395,961 B2 | 7/2008 | Challa et al. |
| 2003/0058261 A1 | 3/2003 | Challa et al. |
| 2008/0035734 A1 | 2/2008 | Challa et al. |
| 2009/0194591 A1 | 8/2009 | Gobburu et al. |

FOREIGN PATENT DOCUMENTS
WO  03063073 A1  7/2003

OTHER PUBLICATIONS

Patent Cooperation Treaty, "PCT Notification of Transmittal of the International Search Report and the Written Opinion of the International Searching Authority, or the Declaration", Jan. 13, 2011, pp. 1-12, PCT/US2010/050459, European Patent Office, Rijswijk.

* cited by examiner

*Primary Examiner* — Michael G Lee
*Assistant Examiner* — Matthew Mikels

(57) ABSTRACT

Barcodes stored by mobile devices can be used in commerce. In sending barcode data optically from a display backlight of a mobile communication device to a barcode scanner optical receiver, the transmitted data bit time needs to be compatible with the frequency range the barcode scanner is designed to receive. The disclosed methods and mobile devices can send barcode data optically at different frequencies from a modulated display backlight to different models/makes of laser barcode scanners that may be used at a point of sale (POS). The disclosed are methods and devices for processing the bit time mix choices make a determination of bit time mix choices based upon predetermined criteria. Location of the device is an example of predetermined criteria. A location may have a particular bit time mix signature that may be accessed, for example, in a look up table.

19 Claims, 4 Drawing Sheets

METHODS AND DEVICES FOR DETERMINING BIT TIME MIX CHOICES OF FREQUENCIES OF OPTICALLY TRANSMITTED BARCODES

FIELD

Disclosed are methods and devices for determining bit time mix choices of frequencies of optically transmitted barcodes, and more particularly, determining a proximity possibility of one or more barcode scanners being proximal to a mobile communication device to determine the bit time mix choices.

BACKGROUND

The makers of mobile communication devices, including those of cellular telephones, are increasingly adding functionality to their devices. Cellular telephones in particular are becoming more than simply mobile communication devices. They are evolving into powerful tools for information management.

Mobile commerce (M-commerce) is yet another functionality being incorporated into the operations of mobile communication devices. Mobile commerce refers to transactions using a wireless device and data connection that result in the transfer of value in exchange for information, services, or goods. Short range wireless communication protocols such as Bluetooth, radio frequency identifier (RFID), WiFi, as well as mobile internet capabilities can enable mobile communication devices such as cellular telephones, PDAs, and netbooks to carry out financial transactions. Mobile commerce, facilitated generally by mobile phones, can include services such as banking, payment, and ticketing. Accordingly, mobile communication devices may replace traditional wallets and credit cards. The emerging technology behind m-commerce may transform the mobile communication device into an electronic wallet.

DETAILED DESCRIPTION

Figure 1:
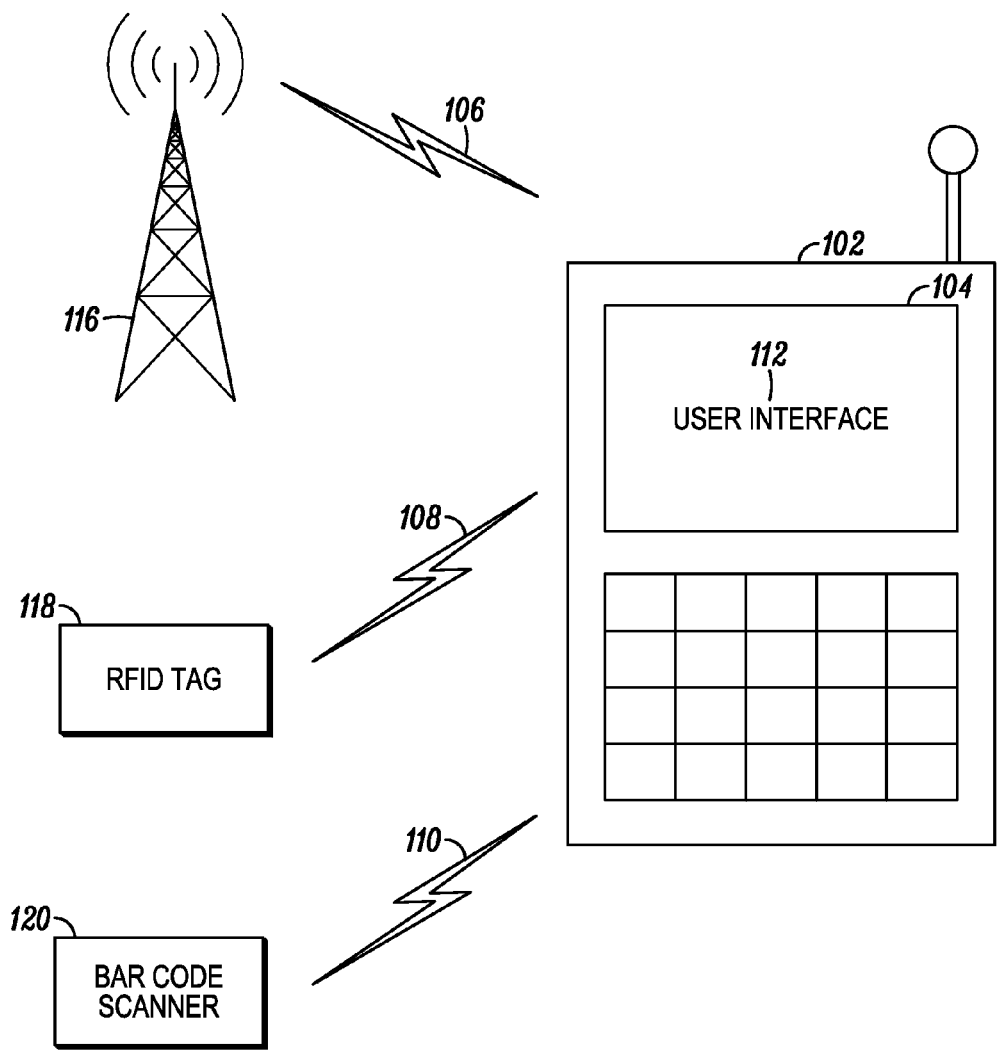
FIG. 1 depicts a mobile communication device/handset including a display that may be in communication with any one of one or more remote servers, one or more RFID tags and/or one or more barcode scanners.

Data including barcodes are stored by mobile devices. For example, barcode data may be downloaded to a mobile communication device. The data may be related to, for example, product and service coupons, ticketing, frequent shopper, user, and/or member royalty IDs, gift card IDs, payment information IDs (bank account or credit card number), and service invoice IDs. The non barcode format data may be encoded into appropriate barcode format by the mobile device.

There are different types of barcodes, and there are many different types of barcode readers. Most notably, many laser barcode scanners that are in use in commerce have scan motor/engines with different scan rates. The scan rates vary from a typical 36 scans/second to 2400 scans/second. The optical receiver and decoder circuits of the barcode scanners are designed to allow AC signals with a predetermined narrow band frequency to pass as a measure to maximize signal to noise ratio. In this manner, a barcode scanner can read an optically transmitted barcode within its operating frequency range. A mobile device can optically transmit barcodes to a laser barcode scanner by modulating its display brightness according to barcode digital pattern in the laser scanner's operating frequency.

As will be discussed below, barcodes stored by mobile devices can be used in commerce. In sending barcode data optically from a display backlight of a mobile communication device to a barcode scanner optical receiver, the transmitted data bit time needs to be compatible with the frequency range the barcode scanner is designed to receive. The disclosed methods and mobile devices can send barcode data optically at a mixture of frequencies from a modulated display backlight to different models/makes of laser barcode scanners that may be used at a point of sale (POS). The disclosed are methods and devices for processing the bit time mix choices make a determination of bit time mix choices based upon predetermined criteria. Location of the device is an example of predetermined criteria. A location may have a particular bit time mix signature that may be accessed, for example, in a look up table.

More specifically, disclosed is a method of a mobile communication device having a display capable of transmitting optical pulses for data communication from the display, the method including determining a proximity possibility of one or more barcode scanners being proximal to the mobile communication device, a determination being in accordance with processing predetermined criteria. The determination to generate one or more bit time mix choices of scan rate frequencies is based on the proximity possibility. Upon making the bit time mix choices of scan rate frequencies, the method can include processing one or more bit time mix choices, and transmitting optical pulses for data communication in accordance with the bit time mix choices.

In particular, processing predetermined criteria includes determining the location of the mobile communication device. Based upon the location determination, a bit time mix choices can be made. A bit time mix choice includes the transmission of a plurality of different frequency transmissions of the same barcode so that there is a high probability that any scanner receiver proximal to the mobile communication device/handset will be able to receive the barcode data.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. While the preferred embodiments of the invention are illustrated and described here, it is clear that the invention is not so limited. Numerous modifications, changes, variations, substitutions, and equivalents will occur to those skilled in the art having the benefit of this disclosure without departing from the spirit and scope of the present invention as defined by the following claims.

It is understood that the use of relational terms, if any, such as first and second, up and down, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as application specific ICs. In the interest of brevity and minimization of any risk of obscuring the principles and concepts according to the present invention, discussion of such software and ICs, if any, is limited to the essentials with respect to the principles and concepts within the preferred embodiments.

FIG. 1 depicts a mobile communication device/handset 102 including a display 104. The device 102 may be in communication 106, 108 and 110 with any one of one or more remote servers 116, one or more short range wireless data transmission devices including for example RFID, Bluetooth (BT) and/or a device or function to capture an optical imaging using the phone camera 118 and/or one or more barcode scanners 120. The mobile communication device 102 may be implemented as a cellular telephone (also called a mobile phone). The mobile communication device 102 represents a wide variety of devices that have been developed for use within various networks. Such handheld communication devices include, for example, cellular telephones, messaging devices, personal digital assistants (PDAs), netbooks, MIDs, notebook or laptop computers incorporating communication modems, mobile data terminals, personal multimedia players (PMPs), application specific gaming devices, video gaming devices incorporating wireless modems, and the like. Any of these portable devices may be referred to as a mobile station or user equipment. Herein, wireless communication technologies may include, for example, voice communication, the capability of transferring digital data, SMS messaging, Internet access, multi-media content access and/or voice over internet protocol (VoIP).

The display 104 is one of display technologies that can provide modulation to transmit optical digital data such as barcode data. For example, LCDs can include backlight power supply controlled by processor via its input and output ports, such as a General Purpose Input/Output (GPIO) to transmit optical digital data. In another example, Organic Light-Emitting Diode (OLED) displays can include a display driver capable of turning the entire display or a sub section of the display on and off for optically transmitted data communication. For example, a mobile communication device backlight LED can have a rise/fall time of approximately 150 nanoseconds. One or more examples of displays configured to transmit barcode data are described by US2008/0253202A1, Communication Information Using an Existing Light Source of an Electronic Device, filed Apr. 12, 2007, which is Incorporated by Reference, herein. It is understood that any manner in which to optically transmit digital data of a barcode by the device 102 is within the scope of this discussion. Moreover, a barcode scanner will often be on continuously. The amount of time an individual barcode transmission may be approximately 100 milliseconds. Accordingly, a plurality of barcode transmissions at different frequencies may occur quite quickly, and may not be of notice to the user.

The server 106 which may be in communication 106 with the device 102 is depicted as a remote server within a wireless communication network. The network of course may be any type of wired or wireless network including an ad hoc or wireless personal area network, a WiFi or wireless local area network, and a cellular or wireless wide area network. Likewise, the server 106 may be of any suitable configuration. The server 106 may be implemented as a single server or as a plurality of servers in communication in any arrangement. The operations of the server 106 may be distributed among different servers or devices that may communicate in any manner. It is understood that the depiction in FIG. 1 is for illustrative purposes.

The server 116 and/or the RFID device or function 118, or any other suitable transmitting device, can transmit data that can be received by the device 102 for determining a proximity possibility of one or more barcode scanners 120 being proximal to the mobile communication device 102. If there had been a determination of a possibility of one or more barcode scanners 120 being proximal to the mobile communication device 102, that determination may include the type or types of barcode scanner 120 and/or at what or frequencies the barcode scanner 120 can most likely read optically transmitted barcode data. Any type of predetermined criteria can be transmitted to the device 102 for a determination of the type or types of barcode scanner 120 and/or a choice of one or more frequencies that may be used by the device 102 to optically transmit barcode data proximal to a barcode scanner 120 at a POS or other barcode scanner location, without user intervention. In the alternative, as described below, the server 116 and/or the short range wireless data transmission means 118, may transmit the bit time mix choice itself (see FIGS. 3, 4 and 5) for one or more proximal barcode scanners.

User intervention may be utilized for different purposes. A user interface 112 may visually, audibly, or in any other manner, prompt or query the user. A query might ask to confirm the store location of the device or other information. A prompt might request that the user initiate the transmission of one or more bit time mix choices, for example, at a POS. It is understood that a POS is one location that may include a barcode scanner 120, and any other location that includes a barcode scanner 120 is within the scope of this discussion.

If a user with a device 102 is proximal a POS that utilizes a barcode scanner 120, data stored in the user's device 102 may be optically transmitted by the device 102 to the barcode scanner 120 reader. Barcode data may be related to, for example, product and service coupons, ticketing, frequent shopper, user, and/or member royalty IDs, gift card IDs, payment information IDs (bank account or credit card number), and service invoice IDs, and as well as any other type of data. It is understood that any barcodes of any type and for any use are within the scope of this discussion.

Figure 2:
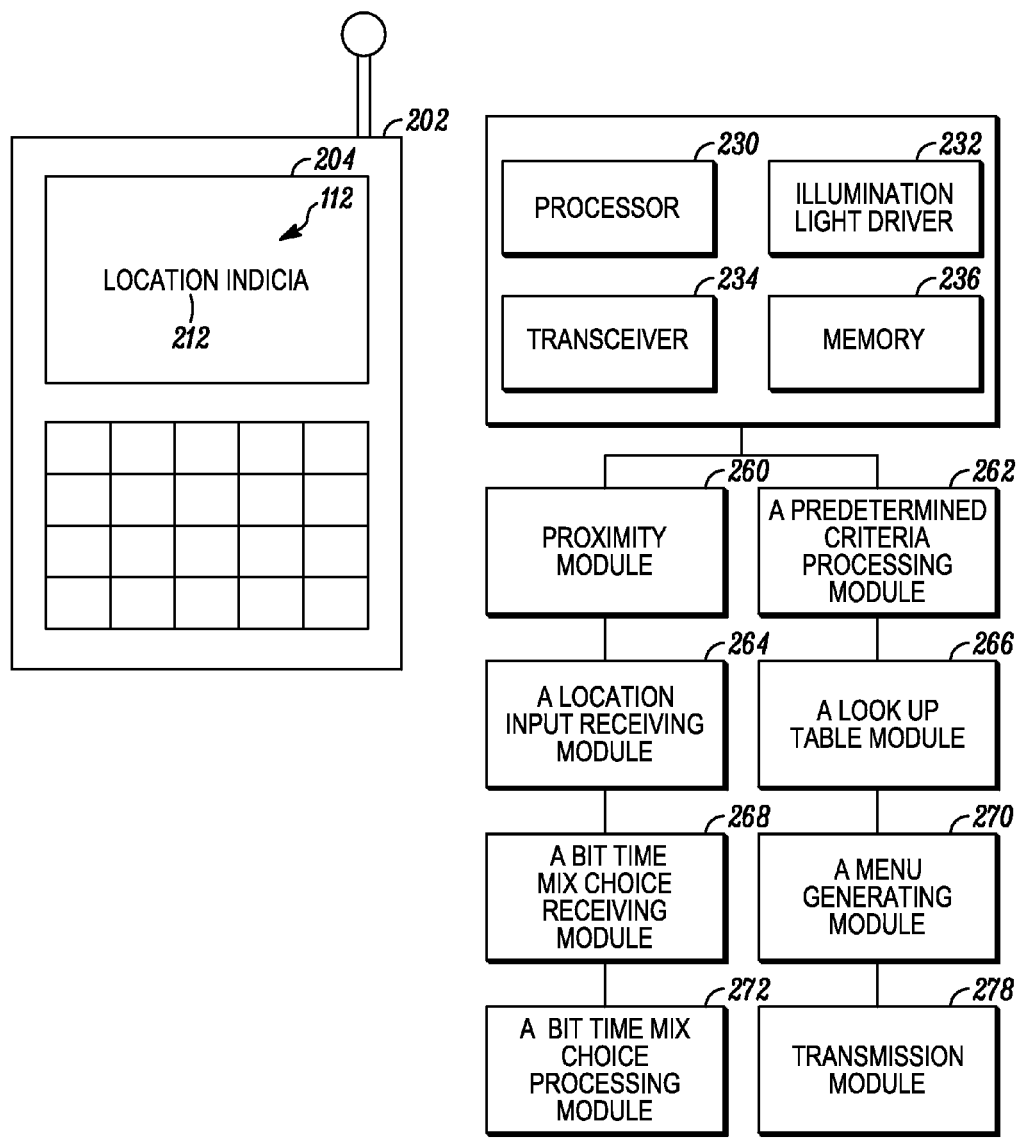
FIG. 2 depicts and embodiment of the device and some of its components including a display configured to or capable of transmitting optical data at the scan rates of different barcode scanners.

FIG. 2 depicts and embodiment of the device 202 and some of its components including a display 204 configured to or capable of transmitting optical data at the scan rates of barcode scanners that can vary, for example, from a typical 36 scans/second to 2400 scans/second as well as within other ranges. The capability of varying the rate of optically transmitting the barcode information during a transmission is so that the device 202 can communication with a range of different types of barcode scanners. For example, as mentioned, one establishment may utilize a plurality of different types of barcode scanners each possibly having a particular scan rate different from one or more of the others. Information of the type or scan rates of the barcode scanners of different establishments and/or different POS' within the same establishment, may be stored on the device 202 within the memory 236 of the device 202.

As mentioned above, the device 202 can for example, include a display 204 having an illumination light and a processor 230 in communication with the display 204 and the illumination light. A display driver 232 can be capable of driving optical pulses for data communication from the display 204 illumination light. Briefly referring to FIG. 1, communication 110 between the illumination light of display 204 and the barcode scanner 120 can include bit time mix choices of scan rate frequencies as will be described in further detail below.

One or more transceivers 234 may communicate 106 with one or more servers 116, communication 108 with one or more short range wireless data transmission means 118 and/or communication 110 with one or more barcode scanners 120. Memory 236 (see FIG. 2) may store modules such a proximity module 260, a predetermined criteria processing module 262, a location input receiving module 264, a look up table module 266, a bit time mix choice receiving module 268, a menu generating module 270, a bit time mix choice processing module 272 and a transmission module 278.

The modules can carry out certain processes of the methods as described herein. Steps of methods may involve modules and modules may be inferred by the methods discussed herein. The modules can be implemented in software, such as in the form of one or more sets of prestored instructions, and/or hardware, which can facilitate the operation of the mobile station or electronic device as discussed below. The modules may be installed at the factory or can be installed after distribution by, for example, a downloading operation. The operations in accordance with the modules will be discussed in more detail below.

As mentioned, the server 116 and/or the short range wireless transfer device or function 118, can transmit data that can be received by the device 102 for determining a proximity possibility of one or more barcode scanners 120 being proximal to the mobile communication device 102. In one circumstance, a user in possession of a device 102 may be mobile at a particular moment or in a fixed location. A server 116 of any type may be in communication with device 102 and may provide which places of business are in the vicinity of the device 102. The device 102 may already have present in its memory 236 a look up table including bit time mix choices of scan rate frequencies of the places of business that are in the vicinity of the device 102. The remote server 116 may serve to provide any number of functions. For example, it may push to the device 102 a reminder that stored in the device 102 is a coupon for a place of business in the vicinity of the device 102 that may be used by a barcode scanner 120. In another example, the remote server 116 may refresh a look up table stored in the memory of the device 102 providing then optimal or other bit time mix choices of scan rate frequencies of the places of business that are in the vicinity of the device 102. It is understood that a method of processing predetermined criteria can include, for example, generating a menu on the display including location indicia 212 and receiving an input signal responsive to the menu identifying a location 212 in accordance with the location indicia, or any other method of processing predetermined criteria.

Figure 3:
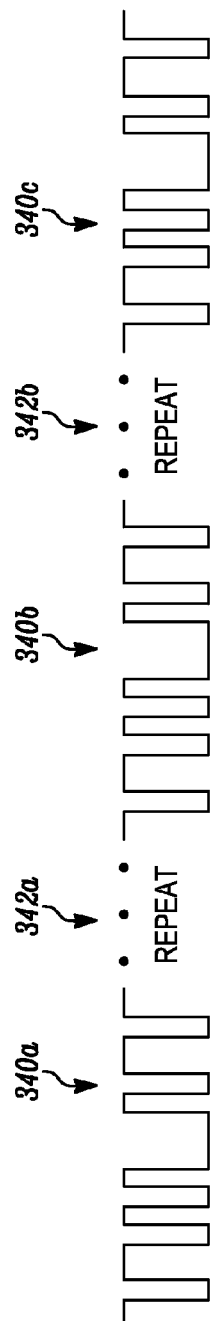
FIGS. 3, 4 and 5 depict bit streams including one or more frequencies at which to transmit a barcode in accordance with bit time mix choices.
Figure 4:
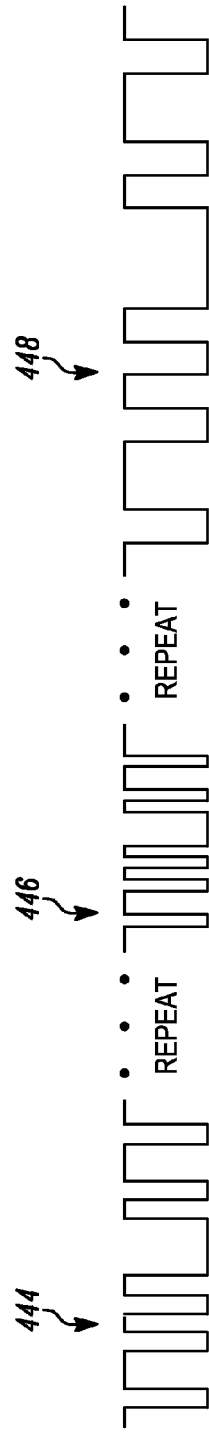
Figure 5:
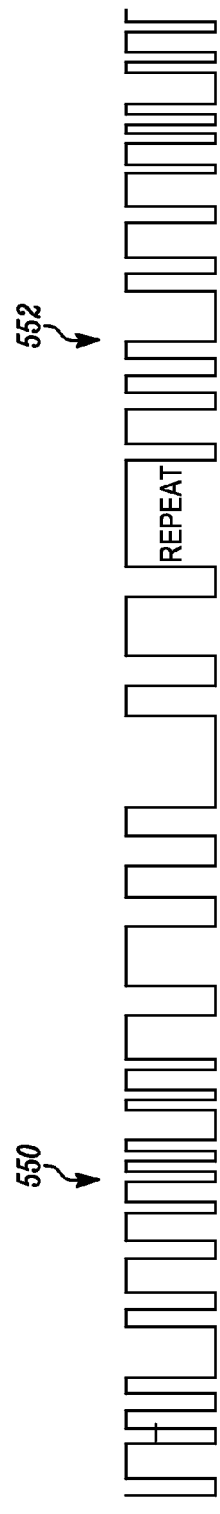

FIGS. 3, 4 and 5 depict bit streams including one or more frequencies at which to transmit a barcode in accordance with bit time mix choices. The determination of the bit time mix choices is made in accordance with processing predetermined criteria to enable mobile communication handset devices to transmit data optically without the need for the handset user's knowledge and/or intervention of the barcode scanner type used. It is also understood that in one or more embodiments, it may be desirable to include user intervention.

To make a determination as to the bit time mix choices, in one embodiment, a look up table that can be stored in memory 236 in accordance with the look up table module 266 can be accessed. The look up table module 266 can be configured to access a look up table to provide to bit time mix choices of scan rate frequencies based upon determining the location of the mobile communication device. It is understood that the determination of such a choice or choices includes all manners in which to make such a determination.

FIG. 3 depicts a bit time mix choice that includes a single barcode digital pattern 340a, 340b and 340c transmitted at a single frequency. The situation may be that the information provided about the barcode scanning equipment at a particular location is uniform, and there may be only one type of barcode scanner at that location. In one situation, there may be a single choice of frequency as depicted in FIG. 3. The pattern may be optically transmitted a plurality of times, repeating the pattern 342a, 342b. FIG. 4 shows that there is more than one frequency at which barcode digital pattern is transmitted. The pattern is transmitted at a first frequency 444, the pattern is transmitted in a second frequency 446 and it is transmitted at a third frequency 448. The situation may be that the information provided about the barcode scanning equipment at a particular location has the possibility of at least three types of barcode scanner at that location, each with different scan rates. The bit time mix choice processing module 272 is configured to process the bit time mix choices based upon the determination and the transmission module 278 is configured to transmit optical pulses for data communication in accordance with the bit time mix choices of scan rate frequencies.

FIG. 5 depicts that while there is more than one frequency at which barcode digital pattern is transmitted, the transmission of the plurality of barcodes transmitted may be streamed 550, and then repeated 552. It is understood that any manner in which to optically transmit one or more barcodes is with the scope of this discussion.

As discussed above a mobile communication handset device can optically transmit barcode digital patterns at different frequencies. The determination based upon predetermined criteria of the location of the handset can provide the choice of bit time mix from the look up table may be, for example, indicated by shop brand name associated with the coupon/barcode information that the user chose when launching a particular barcode. In another example, the choice of bit time mixes from the look up table may be dictated by location input from the phone GPS and navigation application. In other embodiments, it can be pushed by the cellular provider if the location of the user is determined by remote service from a service provider. Moreover, it can be prompted by an in-store geo-tag or RFID tag (a location code, not the entire look up table) and/or it picked up to the phone using the phone camera (taking a picture of the store logo or a barcode displayed in the store), it can be pulled by the phone WiFi or Bluetooth receiver and/or it can be pulled by the phone NFC transceiver (tapping the phone on a NFC tag displayed in the store). Alternatively, with a query, it can be manually selected by the user. Furthermore, actual bit time mix can be given to the device 102 based on its location information where the device 102 GPS detects location and pulls information from service provider for bit time mix information. In yet another embodiment, a cellular service provider can detect the phone location, and pushes the bit time mix to the device 102. It is understood that the look up table can be updated, for example, via one or more processes mentioned above.

Figure 6:
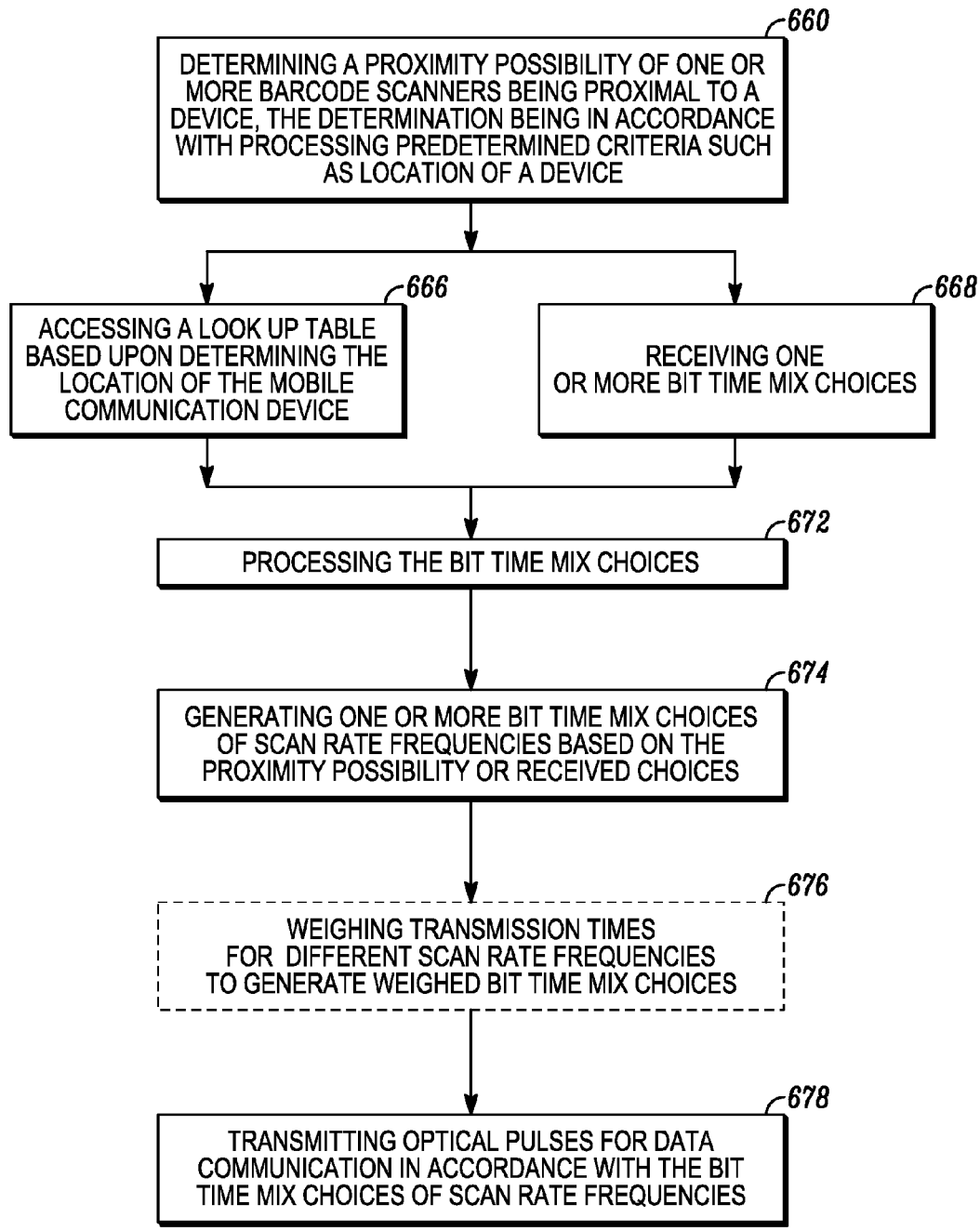
FIG. 6 is an embodiment of a flow chart of a method a mobile communication device having a display capable of transmitting optical pulses for data communication from the display.

FIG. 6 is an embodiment of a flow chart of a method a mobile communication device such as 102 (see FIG. 1) having a display 104 capable of transmitting optical pulses for data communication from the display 104. The method can include determining 660 in accordance with a proximity module 260 (see FIG. 2) configured to determine a proximity possibility of one or more barcode scanners being proximal to the mobile communication device. A determination can include processing predetermined criteria in accordance with a predetermine criteria processing module 262. The possibility of determining location of the device 102 in accordance with the location determining module 264 can provide the determination to generate one or more bit time mix choices of scan rate frequencies.

As mentioned above, there are different manners in which to determine at which frequencies to send an optically transmitted barcode. Once the location is determined, processing the bit time mix choices can include accessing 666 a look up table, in accordance with a look up table module 266. In another example, the device can receive one or more bit time mix choices in accordance with a bit time mix choice receiving module 268. As mentioned, a local transmitter such as WiFi, Bluetooth or a RFID tag, can transmit a bit time mix choice for the location of the device 102 (see FIG. 1). A menu on the user interface 112 of the display 104, can also provide choices to the user to indicate the location and/or chose a location indicia 212 from, for example, a menu, or other predetermined criteria to make the bit time mix choice, in accordance with the menu generating module 270. In any event, the bit time mix choice is processed 672 in accordance with the processing module 272 and one or more bit time mix choices of scan rate frequencies based on the proximity possibility or received choices is generated 674. In one embodiment, weighing transmission times 676 for different scan rate frequencies to generate weighed bit time mix choices may provide weighed output. Transmitting 678, in accordance with the transmitting module 278, optical pulses for data communication in accordance with the bit time mix choices of scan rate frequencies.

As discussed above, barcodes stored by mobile devices can be used in commerce. In sending barcode data optically from a display backlight of a mobile communication device to a barcode scanner optical receiver, the transmitted data bit time needs to be compatible with the frequency range the barcode scanner is designed to receive. The disclosed methods and mobile devices can send barcode data optically at different frequencies from a modulated display backlight to different models/makes of laser barcode scanners that may be used at a point of sale (POS). The disclosed are methods and devices for processing the bit time mix choices make a determination of bit time mix choices based upon predetermined criteria.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

The invention claimed is:

1. A method in a mobile communication device having a display capable of transmitting optical pulses for data communication from the display, comprising:

determining, in accordance with a proximity module of the mobile communication device, a proximity possibility of one or more barcode scanners being proximal to the mobile communication device, a determination being in accordance with processing predetermined criteria, the determination to generate one or more bit time mix choices of scan rate frequencies based on the proximity possibility;

processing the bit time mix choices based upon the determination; and transmitting optical pulses for data communication in accordance with the bit time mix choices of scan rate frequencies.

2. The method of claim 1 wherein processing predetermined criteria comprises:

determining the location of the mobile communication device.

3. The method of claim 2 wherein determining the location of the mobile communication device comprises:

receiving transmitted location information.

4. The method of claim 3 wherein receiving transmitted location information comprises:

receiving at least one of GPS data, locally transmitted data, cellular data, and RFID tag data.

5. The method of claim 3 wherein processing the bit time mix choices comprises:

accessing a look up table based upon determining the location of the mobile communication device.

6. The method of claim 1 wherein processing predetermined criteria comprises:

generating a menu on the display including location indicia;

receiving an input signal responsive to the menu identifying a location in accordance with the location indicia.

7. The method of claim 1 wherein processing predetermined criteria comprises:

receiving one or more bit time mix choices.

8. The method of claim 1 wherein transmitting optical pulses comprises:

transmitting data with fixed bit time mixed frequency rates.

9. The method of claim 1 wherein transmitting optical pulses comprises:

weighing transmission times for different scan rate frequencies to generate weighed bit time mix choices; and transmitting data in accordance with a weighed bit time mix choices.

10. A method a mobile communication device having a display capable of transmitting optical pulses for data communication from the display, comprising:

determining, in accordance with a proximity module of the mobile communication device, a proximity possibility of one or more barcode scanners being proximal to the mobile communication device, a determination being in accordance with processing predetermined criteria, the determination to generate one or more bit time mix choices of scan rate frequencies based on the proximity possibility wherein processing predetermined criteria includes determining the location of the mobile communication device based upon receiving transmitted location information.

11. The method of claim 10 wherein receiving transmitted location information comprises:

receiving at least one of GPS data, locally transmitted data, cellular data, and RFID tag data.

12. The method of claim 10 wherein processing predetermined criteria comprises:

generating a menu on the display including location indicia;

receiving an input signal responsive to the menu identifying a location in accordance with the location indicia.

13. The method of claim 10 further comprising:
processing the bit time mix choices based upon the determination; and
transmitting optical pulses for data communication in accordance with the bit time mix choices of scan rate frequencies.

14. The method of claim 13 wherein processing the bit time mix choices comprises:
accessing a look up table based upon determining the location of the mobile communication device.

15. A mobile communication device, comprising:
a display having an illumination light;
a processor in communication with the display and the illumination light;
a display driver capable of driving optical pulses for data communication from the display illumination light;
a proximity module of the mobile communication device configured to determine a proximity possibility of one or more barcode scanners being proximal to the mobile communication device, a determination being in accordance with processing predetermined criteria, the determination to generate one or more bit time mix choices of scan rate frequencies based on the proximity possibility;
a bit time mix choice module configured to process the bit time mix choices based upon the determination; and
a transmission module configured to transmit optical pulses for data communication in accordance with the bit time mix choices of scan rate frequencies.

16. The device of claim 15 further comprising:
a predetermined criteria processing module configured to determine the location of the mobile communication device by receiving transmitted location information including at least one of GPS data, locally transmitted data, cellular data, and RFID tag data.

17. The device of claim 16 further comprising:
a look up table module configured to access a look up table to provide to bit time mix choices of scan rate frequencies based upon determining the location of the mobile communication device.

18. The device of claim 15 further comprising:
a menu generating module configured to generate a menu on the display including location indicia to process predetermined criteria; and
a location input receiving module configured to receive an input signal responsive to the menu identifying a location in accordance with the location indicia.

19. The device of claim 15 further comprising:
a bit time mix choice receiving module configured to process predetermined criteria by receiving one or more bit time mix choices.

* * * * *